(12) United States Patent
Matsuda (10) Patent No.: US 10,386,846 B2
(45) Date of Patent: Aug. 20, 2019

(54) TARGET PATH GENERATING DEVICE AND DRIVING CONTROL DEVICE

(71) Applicant: Nissan Motor Co., Ltd., Yokohama-shi, Kanagawa (JP)

(72) Inventor: Takuro Matsuda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/541,382

(22) PCT Filed: Jun. 30, 2015

(86) PCT No.: PCT/IB2015/001074
§ 371 (c)(1),
(2) Date: Jul. 3, 2017

(87) PCT Pub. No.: WO2016/110728
PCT Pub. Date: Jul. 14, 2016

(65) Prior Publication Data
US 2018/0024564 A1 Jan. 25, 2018

Related U.S. Application Data

(60) Provisional application No. 62/099,640, filed on Jan. 5, 2015.

(51) Int. Cl.
*G05D 1/02* (2006.01)
*G08G 1/04* (2006.01)
(Continued)

(52) U.S. Cl.
CPC ........... *G05D 1/0214* (2013.01); *B60R 21/00* (2013.01); *B60W 30/09* (2013.01);
(Continued)

(58) Field of Classification Search
CPC ...... B60W 30/08; B60W 30/09; B60W 30/10; G05D 1/0212; G05D 1/0214; G08G 1/16
See application file for complete search history.

(56) References Cited

U.S. PATENT DOCUMENTS 8,346,436 B2 1/2013 Yokoyama et al.
2004/0090117 A1 5/2004 Dudeck et al.
(Continued)

FOREIGN PATENT DOCUMENTS

EP 2 006 181 A2 12/2008
EP 2 042 962 A1 4/2009
(Continued)

*Primary Examiner* — Anshul Sood
(74) *Attorney, Agent, or Firm* — Global IP Counselors, LLP (57) ABSTRACT

A target pathway generating device is provided with a map information acquisition unit, a curved path determination unit, an obstacle determination unit and a target pathway generating unit. The map information acquisition unit acquires map information. The curved path determination unit determines whether or not a curved path is present on a driving pathway of a vehicle based on the map information. Upon determining that a curved path is present, the obstacle determination unit determines whether or not there is an object to be avoided in the vicinity of the curved path. Upon determining that there is an object to be avoided, the target path generating unit generates a target pathway of the vehicle in order to avoid a predetermined region including the object to be avoided.

13 Claims, 6 Drawing Sheets

(51) Int. Cl.
*G08G 1/052* (2006.01)
*G08G 1/16* (2006.01)
*B60R 21/00* (2006.01)
*B60W 30/10* (2006.01)
*G08G 1/0968* (2006.01)
*B62D 15/02* (2006.01)
*B60W 30/09* (2012.01)
*B60W 30/095* (2012.01)
*G05D 1/00* (2006.01)

(52) U.S. Cl.
CPC .......... *B60W 30/095* (2013.01); *B60W 30/10* (2013.01); *B62D 15/0265* (2013.01); *G05D 1/0246* (2013.01); *G05D 1/0257* (2013.01); *G05D 1/0274* (2013.01); *G05D 1/0278* (2013.01); *G08G 1/04* (2013.01); *G08G 1/052* (2013.01); *G08G 1/096827* (2013.01); *G08G 1/16* (2013.01); *G08G 1/166* (2013.01); *G05D 1/0088* (2013.01); *G05D 2201/0213* (2013.01)

(56) References Cited

U.S. PATENT DOCUMENTS

| | | | |
|---|---|---|---|
| 2009/0088966 A1* | 4/2009 | Yokoyama | B62D 15/025 701/533 |
| 2010/0235035 A1* | 9/2010 | Nishira | B60T 7/22 701/31.4 |
| 2011/0022317 A1* | 1/2011 | Okita | B60W 30/12 701/301 |

FOREIGN PATENT DOCUMENTS

| | | |
|---|---|---|
| EP | 2 116 440 A1 | 11/2009 |
| JP | 2003-157484 A | 5/2003 |
| JP | 2005-141724 A | 6/2005 |
| JP | 2007-90951 A | 4/2007 |
| JP | 2009-78733 A | 4/2009 |
| JP | 2011-240816 A | 12/2011 |
| JP | 2013-173416 A | 9/2013 |

* cited by examiner

TARGET PATH GENERATING DEVICE AND DRIVING CONTROL DEVICE

CROSS-REFERENCE TO RELATED APPLICATIONS

This application is a U.S. National stage application of International Application No. PCT/IB2015/001074, filed Jun. 30, 2015.

BACKGROUND

Field of the Invention

The present invention relates to a target pathway generating device and a driving control device. More specifically, the present invention relates to a target pathway generating device that generates a target pathway for controlling the driving of a vehicle, and a driving control device that comprises the target pathway generating device.

Background Information

Attempts are being made to develop an autonomous driving control device that is capable of autonomously controlling a vehicle from a departure point to a destination (for example refer to Japanese Laid-Open Patent Publication No. 2011-240816—Patent Document 1). In this type of autonomous driving control device, for example, a driving path of a vehicle from a departure point to a destination is calculated using a well-known navigation technique, and lanes and obstacles on the driving path are detected using sensing technology, such as a radar sensor, an image sensor, etc. The autonomous driving control device causes the vehicle to drive autonomously along a driving path based on the detected information.

SUMMARY

In an autonomous driving control device, when a presence of an obstacle is detected in front of the vehicle, a driving control for avoiding the obstacle is required. However, if a sudden change is made to the driving of the vehicle in order to avoid the obstacle, an unexpected change for the user will occur in the behavior of the vehicle, and the user will feel discomfort in the ride quality.

In order to solve the problem described above, an object of the present invention is to provide a target pathway generating device that suppresses discomfort imparted to the user, even when detecting an obstacle.

A target pathway generating device as one embodiment of the present invention, comprises a map information acquisition unit, a curved path determination unit, an obstacle determination unit, and a target pathway generating unit. The map information acquisition unit acquires map information. The curved path determination unit determines whether or not a curved path is present on a driving pathway of a vehicle, based on the map information. Upon determining that a curved path is present, the obstacle determination unit determines whether or not there is an object to be avoided in the vicinity of the curved path. Upon determining that an object to be avoided is present, the target pathway generating unit generates a target pathway for the vehicle that avoids a predetermined area including the object to be avoided.

According to the target pathway of the present invention, it is possible to provide a target pathway generating device that suppresses discomfort imparted to the user, even when detecting an object to be avoided in the vicinity of a curved path.

DETAILED DESCRIPTION OF THE EMBODIMENTS

Embodiments of the present invention will be described below based on the embodiments illustrated in the drawings.

First Embodiment

Figure 1:
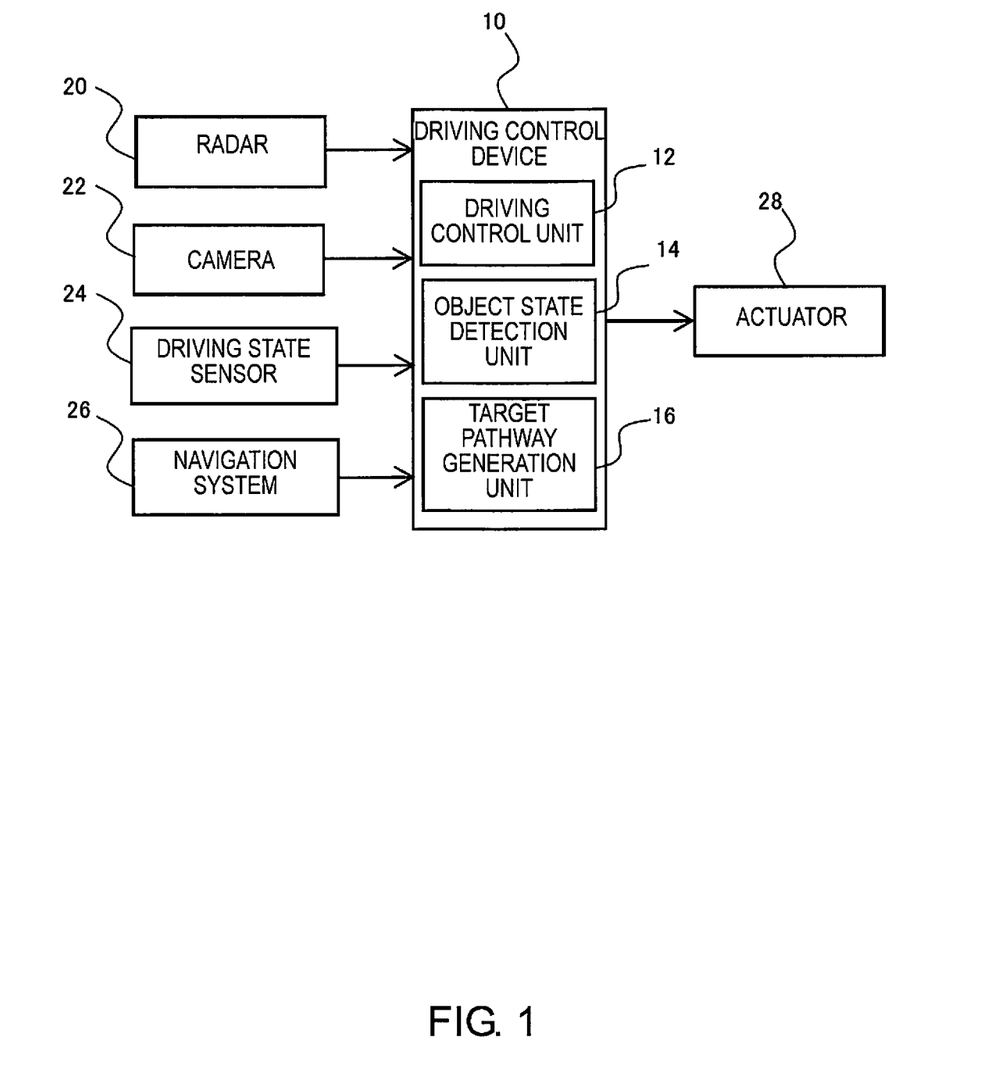
FIG. 1 is a block diagram illustrating the configuration of the driving control device according to a first embodiment.

The configuration of the driving control device 10 according to the first embodiment will be described with reference to FIG. 1. FIG. 1 is a block diagram illustrating the configuration of the driving control device according to the first embodiment. The driving control device 10 is a device mounted in a vehicle, and is a device that controls the automatic driving of the vehicle.

Radar 20, a camera 22, a driving state sensor 24, a navigation system 26, an actuator 28, and the like, are electrically connected to the driving control device 10, as illustrated in FIG. 1. The driving control device 10 can be appropriately connected to other well-known configurations, such as a communication unit for carrying out inter-vehicle communication.

The radar 20 detects the presence, position, and speed, as well as the relative speed with respect to the host vehicle, of a vehicle, a motorcycle, a bicycle, a pedestrian, and the like, surrounding the host vehicle. The radar 20 comprises, for example, a laser radar, a millimeter wave radar, or the like. In addition, the radar 20 outputs the detected data to the driving control device 10. Since a well-known radar can be appropriately used as the radar 20, a detailed description of the configuration will be omitted.

The camera 22 is, for example, attached to the front or the side of the host vehicle, and captures an image of the host vehicle's surroundings. For example, the camera 22 captures road section lines and obstacles on the course. The camera 22 comprises an imaging element, such as a CCD (Charge Coupled Device) or CMOS (Complementary Metal-oxide Semiconductor). The camera 22 outputs captured image signals to the driving control device 10. Since a well-known camera can be appropriately used as the camera 18, a detailed description of the configuration will be omitted.

The driving state sensor 24 detects the driving state (for example, vehicle speed, acceleration, yaw angle, etc.) of the host vehicle. The driving state sensor 24 has, for example, a wheel speed sensor provided for each wheel of the host vehicle, and detects the driving state of the host vehicle, such as the vehicle speed, by measuring the wheel speed. The driving state sensor 24 outputs the detected driving state of the host vehicle to the driving control device 10. Since a well-known vehicle speed sensor, acceleration sensor, and yaw angle sensor, etc., can be used as the driving state sensor 24, a detailed description of the configuration will be omitted.

The navigation system 26 receives GPS signals from a GPS (Global Positioning System) satellite. In addition, the navigation system 26 can comprise a gyroscope that detects the magnitude of a rotational movement applied to the vehicle, an acceleration sensor that detects the driving distance of the vehicle from acceleration in three axial directions, and the like, and a geomagnetic sensor that detects the driving direction of the vehicle from geomagnetism, or the like. The navigation system 26 stores map information, which is stored in a mass storage medium, such as a CD-ROM (Compact Disc Read-Only Memory), DVD-ROM (Digital Versatile Disc), or HDD (Hard Disk Drive). The map information includes, for example, information on the number of lanes; road surface indication information, such as lane dividing lines, road outer lines that are present at both sides of the road, lane center lines of multiple lanes, stop lines, pedestrian crossings, and road surface marks; and road shape information, such as the curvature and road width of the roads. In addition, the map information includes drivable area information that is set in advance according to the road shape and which indicates the drivable range of a vehicle and obstacle information, such as guardrails, walls, curbs, and buildings. Furthermore, the map information includes information on general roads and expressways; intersection information, such as the location and shape of intersections; feature information, such as signals and signs; and road condition information, such as parking areas, congestion, road construction, and lane closures. The navigation system 26 detects the position of the vehicle and the orientation with respect to the road based on the map information and GPS signals from a GPS satellite. The navigation system 26 searches a course (pathway) from the departure point to the destination, according to inputs of the departure point (or the current position) and the destination, and carries out pathway guidance to the destination, using the searched course and the positional information of the host vehicle. The navigation system 26 outputs the searched course to the destination included in the map information, to the driving control device 10. Since a well-known navigation system can be appropriately used as the navigation system 26, a detailed description of the configuration will be omitted.

The actuator 28 includes a steering actuator, which is an electric actuator that applies an assist torque to the steering wheel. By the steering actuator being controlled by the driving control device 10, an arbitrary turning angle is applied to the rotation angle of the steering that is the wheels, in order to carry out a steering operation of the vehicle. In addition to the steering actuator, the actuator 28 includes a brake actuator for carrying out a braking operation of the host vehicle by generating a braking force on the wheels, and an accelerator pedal actuator that applies a pedal reaction force to the accelerator pedal. Since a well-known actuator can be used as the actuator 28, a detailed description of the configuration will be omitted.

The driving control device 10 is a computer that includes, for example, a ROM (Read Only Memory) in which a program for controlling the driving force of the host vehicle is stored; a CPU (Central Processing Unit) as an operating circuit that functions as a driving control device 10 by executing the program that is stored in the ROM; a RAM (Random Access Memory) that functions as an accessible storage device; and a storage means, such as a hard disk.

The control device 10 comprises a drive control unit 12, an object state detection unit 14, and a target pathway generating unit 16 as a target pathway generating device.

The driving control unit 12 carries out a drive control (driving control) of the host vehicle, by controlling the actuator 28 based on a target pathway generated by the target pathway generating unit 16 described later. Specifically, the drive control unit 12 obtains the control amounts for the engine, brake, and steering necessary for following the target pathway generated by the target pathway generating unit 16, and outputs these control amounts to the actuator 28.

The object state detection unit 14 detects the position of an object present in the surroundings the host vehicle and the speed of a moving body, based on data from the radar 20. In addition, the object state detection unit 14 comprises an image processor and executes a predetermined image processing with respect to image signals captured by the camera 22, to detect the road conditions surrounding the host vehicle.

The target pathway generating unit 16 acquires map information from the navigation system 26 and generates a target pathway from a departure point to the destination. The target pathway generated by the target pathway generating unit 16 includes the driving trajectory of the vehicle along the course to the destination, as well as behavior information of the vehicle (for example, vehicle speed, acceleration, steering angle, etc.). For example, the target pathway generating unit 16 divides the course from a departure point to the destination into a plurality of sections at predetermined distances and acquires, for each section, map information that includes the course from the navigation system 26, to generate and update the target pathway. For example, the target pathway generating unit 16 sets a pathway update point before the endpoint of each section, and calculates and generates a target pathway of the subsequent section at the pathway update point. Of course, the method of dividing the sections and the method of setting the pathway update points are not limited to the above. For example, it is not necessary for the all of the sections to be divided into the same distances, and the method of dividing can be changed as necessary.

Basically, when generating a target pathway, the target pathway generating unit 16 calculates the target trajectory of the vehicle (driving trajectory) and the behavior of the vehicle, and generates a target pathway, such that the vehicle travels in the center of the drivable area, which is acquired from the map information. The generation of a target pathway that passes the center of the drivable area reduces the calculation load relating to the generation of a target pathway. The drivable area is, for example, area information that is set in advance as a range in which a vehicle can travel so as to secure a predetermined margin from the two ends of a lane or from lane dividing lines, giving consideration to the road shape and the width of the vehicle. The predetermined margin can be a fixed value, or can be change as necessary. For example, the predetermined margin can be changed to an avoidance margin that is greater than the normal margin, when detecting an obstacle to be avoided with respect to the driving of the vehicle. In the first embodiment, an example will be described in which the drivable area is acquired from the map information as a range in which a vehicle can travel, but no limitation is imposed thereby. For example, boundary line information that indicates the boundaries of the range in which a vehicle can travel can be contained in the map information, and the boundary line information can be acquired from the map information as the range in which a vehicle can travel.

It is assumed that driving of a curved path will occur in an automatic driving of a vehicle. If there is an obstacle on the curved path, it can be predicted that a mentality will be in effect in the user to carry out a driving of the curved path so as not to approach the obstacle as much as possible, in order to avoid the risk of contact or collision with the obstacle. Therefore, if an obstacle is recognized in the vicinity of a curved path, it will be required to generate a target pathway that is away from the obstacle. On the other hand, however, if a target pathway that abruptly changes the progress direction of the vehicle is generated in the vicinity of a curved path in order to avoid an obstacle, there is the possibility that an unexpected change for the user will occur in the behavior of the vehicle, which is driving following the target pathway, and that the user will feel discomfort in the ride quality.

Therefore, the target pathway generating device 16 is provided with at least a map information acquisition unit that acquires map information, a curved path determination unit that determines whether or not a curved path is present on a course of a vehicle (driving pathway) based on the map information, an obstacle determination unit that determines whether or not there is an object to be avoided in the vicinity of the curved path upon determining that a curved path is present, and a target pathway generating unit that generates a target pathway for the vehicle that avoids a predetermined area including the object to be avoided upon determining that an object to be avoided is present.

Specifically, the target pathway generating unit 16 according to the first embodiment comprises the following configuration, in order to realize an automatic driving of a vehicle that matches the psychology of the user while reducing the discomfort in the ride quality, when an obstacle is recognized adjacent to a curved path on which a vehicle is driving during automatic driving.

Figure 2:
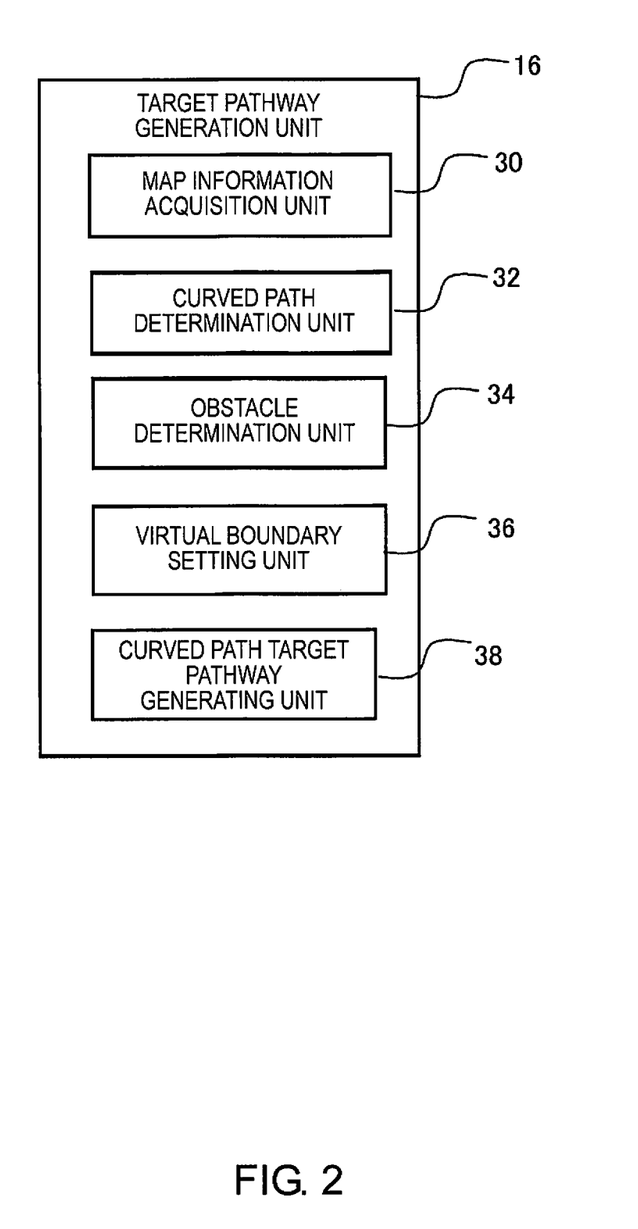
FIG. 2 is a block diagram illustrating the configuration of the target pathway generating unit according to the first embodiment.

The configuration of the target pathway generating unit 16 will be described, with reference to FIG. 2. FIG. 2 is a block diagram illustrating the configuration of the target pathway generating unit according to the first embodiment. The target pathway generating unit 16 as a target pathway generating device comprises a map information acquisition unit 30, a curved path determination unit 32, an obstacle determination unit 34, a virtual boundary setting unit 36, and a curved path target pathway generating unit 38 as a target pathway generating unit. The map information acquisition unit 30 acquires map information from the navigation system 26 when generating a target pathway. The curved path determination unit 32 determines whether or not a curved path is present in a course of a vehicle (driving pathway) based on the acquired map information. A curved path is a road with a curved shape that is bent in a rightward direction or a leftward direction, and can include, for example, a right-turn road, a left-turn road, a right-turn-only road, and a left-turn-only road, at an intersection. Upon determining that a curved path is present, the obstacle determination unit 34 determines whether or not there is an object to be avoided in the vicinity of the curved path, based on the acquired map information. In the first embodiment, the obstacle determination unit 34 determines whether or not a physical obstacle, such as a curb, a wall, a building, a parking area, or a road construction area, is present as an object to be avoided in the middle of the curved path. For example, the obstacle determination unit 34 can determine whether or not a physical obstacle, such as a curb, a wall, or a building, is present at the sides that define the outer side of the curve of the curved path. Additionally, the obstacle determination unit 34 can determine whether or not a physical obstacle, such as a parking area or a road construction area, is present adjacent to the ends that define the outer side of the curve of the curved path.

When it is determined that an object to be avoided is present in the middle of the curved path, the virtual boundary setting unit 36 sets a virtual boundary that extends from the object to be avoided. Furthermore, the curved path target pathway generating unit 38 generates a target pathway based on the set virtual boundary.

Figure 3:
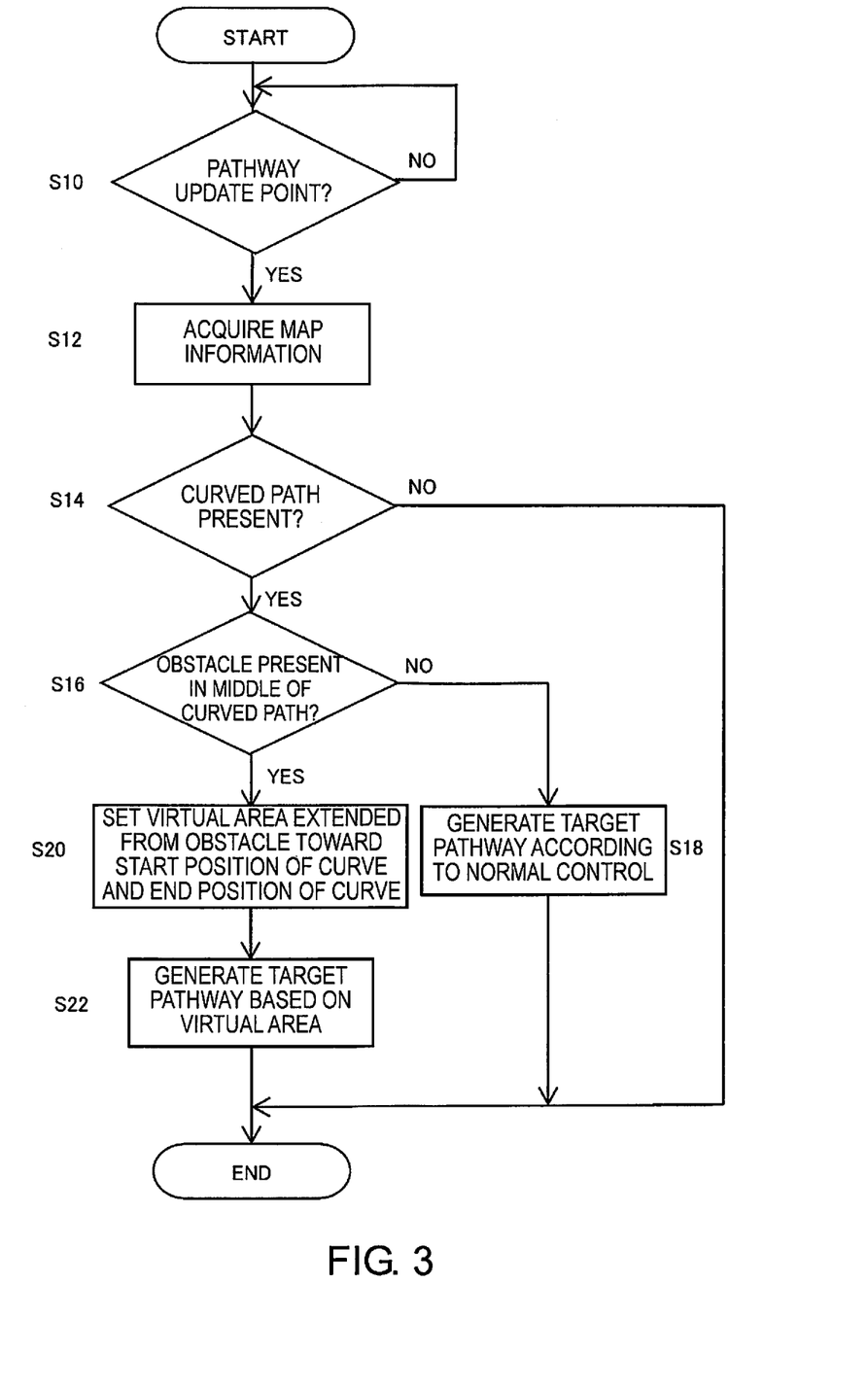
FIG. 3 is a flowchart illustrating the process of generating a target pathway for a curved path according to the first embodiment.
Figure 4:
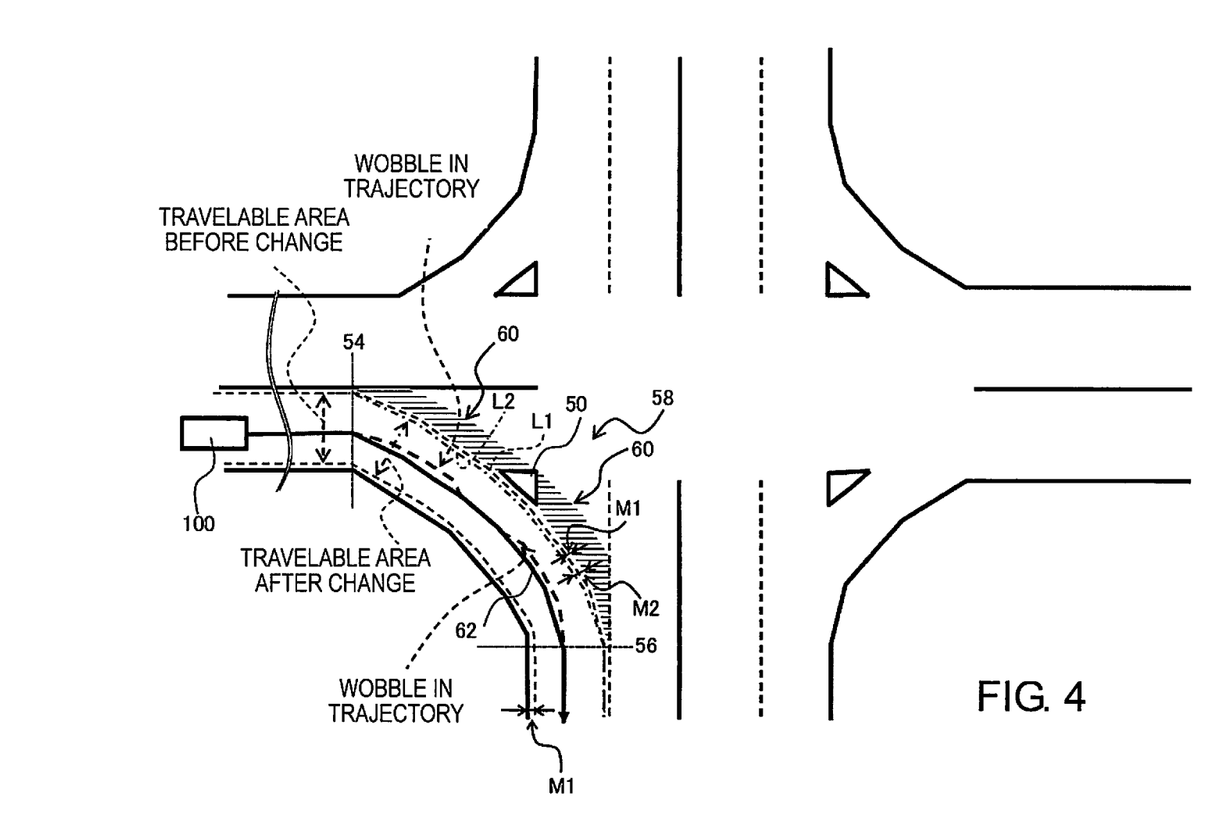
FIG. 4 is a schematic view illustrating a road layout with a curved path and a target trajectory of the vehicle according to the first embodiment.

The process of generating a target pathway for a curved path by the target pathway generating unit 16 according to the first embodiment will be described, with reference to FIG. 3 and FIG. 4. FIG. 3 is a flowchart illustrating the process of generating a target pathway for a curved path according to the first embodiment. FIG. 4 is a schematic view illustrating the road layout of a curved path and a target trajectory of the vehicle according to the first embodiment.

Here, an example will be described in which the map information acquired when generating a target pathway contains a course wherein the lane in which a vehicle 100 is currently automatically driving is connected to an intersection in the subsequent section, and the vehicle will travel on a right-turn-only road at the intersection, as illustrated in FIG. 4. In addition, the map information contains obstacle information to the effect that a curb 50 is present, as an object to be avoided, in the middle of the right-turn-only road, at a side portion that defines the outer boundary of the curve of the right-turn-only road.

First, the target pathway generating unit 16 determines whether or not an automatically driving vehicle has passed a pathway update point, based on GPS signals and map information from the navigation system 26, in Step S10. Here, it is assumed that a vehicle 100 equipped with a driving control device 10 has passed a pathway update point. Upon determining that the vehicle 100 has not reached the pathway update point (NO in Step S10), the target pathway generating unit 16 repeats the process of Step S10 until it is determined that the vehicle 100 has reached the pathway update point.

Upon determining that the vehicle 100 has passed the pathway update point (YES in Step S10), the map information acquisition unit 30 acquires the map information of the subsequent section from the navigation system 26 in Step S12.

When the map information is acquired in Step S12, the curved path determination unit 32 determines whether or not a curved path is present in the subsequent section for which a target pathway should be generated, referring to the map information, in Step S14. Here, a course is searched wherein the lane in which the vehicle 100 is currently automatically driving is connected to an intersection in the subsequent section, and the vehicle 100 will travel on a right-turn-only road at the intersection, as described above. Therefore, the curved path determination unit 32 determines that a curved path is present in Step S14. At this time, the curved path determination unit 32 further identifies a curved path start position 54 and a curved path end position 56, with reference to road shape information acquired from the map information, and the like. Furthermore, the curved path determination unit 32 specifies the portion between the curved path start position 54 and the curved path end position 56 as a curve path 58. The curved path start position 54, the curved path end position 56, and the curve path 58 can also be specified in the map information in advance.

Upon determining that a curved path is not present in Step S14 (NO in Step S14), the target pathway generating unit 16 ends the process of generating a target pathway.

On the other hand, upon determining that a curved path is present in Step S14 (YES in Step S14), the obstacle determination unit 34 determines whether or not a physical obstacle is present in the middle of the curve path 58 in Step S16. In the first embodiment, the map information contains obstacle information to the effect that a curb 50 is present in the middle of the curve of a right-turn-only road, at a side portion that defines the outer boundary of the curve of the right-turn-only road. Therefore, the obstacle determination unit 34 determines that a physical obstacle is present in Step S16.

Upon determining that a physical obstacle is not present in Step S16 (NO in Step S16), the target pathway generating unit 16 executes the generation of a target pathway in the curved path by a normal control (Step S18). As an example of a normal control, the target pathway generating unit 16 generates a target pathway, whereby the vehicle 100 travels the center of the drivable area acquired from the map information.

On the other hand, upon determining that an obstacle is present in Step S16 (YES in Step S16), the virtual boundary setting unit 36 sets a virtual boundary in Step S20. Specifically, the virtual boundary setting unit 36 provides a virtual area 60 that extends from the curb 50 as a physical obstacle, toward the curved path start position 54 and toward the curved path end position 56, which are specified in Step S14, along the curve of the right-turn-only road, and sets the virtual area 60 as a virtual boundary, as illustrated in FIG. 4. While the virtual area 60 is set as the virtual boundary here, the virtual boundary is not limited to the virtual area 60. For example, the virtual boundary can be a virtual line that extends from the curb 50 along the curve of the right-turn-only road.

Then, the curved path target pathway generating unit 38 generates a target pathway 62 based on the set virtual area 60 in Step S22. Specifically, the curved path target pathway generating unit 38 recognizes the set virtual area 60 as a physical obstacle, in the same manner as the curb 50, and generates a target pathway 62 provided with the same avoiding distance with respect to not only the curb 50, but also the virtual area 60. In the first embodiment, the position of a boundary L1, which is, of the boundaries that define the width of the drivable area acquired from the map information, the boundary closer to the virtual area 60 and the curb 50, is moved to the L2 position, which is further separated from the curb 50 and the virtual area 60. That is, the margin M1, which was set in the map information with respect to the right-turn-only road, is changed to a larger margin M2, and the widthwise distance of the drivable area is reduced. Then, the curved path target pathway generating unit 38 generates a target pathway 62, whereby the vehicle 100 travels the center of the reduced width of the drivable area. In this manner, in the first embodiment, the boundary of the drivable area is changed from L1 to L2, and the margin (avoiding distance) between the boundary of the drivable area and the curb 50, as well as the virtual area 60, is changed. That is, by changing the widthwise distance of the drivable area, a target pathway 62 is generated whereby the vehicle smoothly travels further on the inner side of the curve than the center of the drivable area, which is set in the map information.

In FIG. 4, the target trajectory of the target pathway 62 of the vehicle generated in the first embodiment is illustrated by a solid line. In addition, in FIG. 4, a driving trajectory that is generated so as to avoid only the curb 50 is illustrated by a dotted line, as a comparative trajectory. In the comparative trajectory illustrated in FIG. 4, a driving trajectory of the vehicle, which secures a predetermined avoiding distance from the curb 50 only for the portion where the curb 50 exists, is generated, so as to match the psychology of the user, desiring to avoid physical obstacles. Therefore, in the comparative trajectory, there are wobbles in the driving trajectory before and after passing the curb 50. Since such wobbles in the driving trajectory on a curved path generate sudden changes in the behavior of the vehicle, discomfort is imparted to the ride quality of the user.

On the other hand, in the first embodiment, the obstacle determination unit 34 determines whether or not an object to be avoided is present in the curve path 58 based on the map information. Then, upon determining that a curb 50 is present in the curve path 58 as an object to be avoided, the virtual boundary setting unit 36 extends a virtual area 60 as the virtual boundary from the curb 50 toward the curved path start position 54 and toward the curved path end position 56. Thereafter, the curved path target pathway generating unit 38 controls the distance between the drivable area, which indicates the drivable range, and the curb 50 as well as the virtual area 60. That is, the curved path target pathway generating unit 38 changes the boundary of the drivable area from L1 to L2, and changes the distance between the boundary of the drivable area and the curb 50, as well as the virtual area 60, by changing the margin M1, of a case in which it is determined that an object to be avoided is absent, to a larger margin M2. Then, the curved path target pathway generating unit 38 generates a target pathway 62 based on the changed margin M2. In this manner, not only the curb 50 but also the virtual area 60 is recognized as a physical obstacle, and a target pathway 62 is generated, which secures the same avoiding distance with respect to not only the curb 50, but also the virtual area 60. Therefore, it is possible to generate a target trajectory 62 that will not cause wobbles in the trajectory of the target pathway in the vicinity of the curb 50. As described above, with the driving control device 10 comprising the target pathway generating unit 16 according to the first embodiment, it is possible to generate a target pathway 62 that is capable of reducing discomfort that is imparted to the user, even when it is determined that a curb 50 is present on the curved path, and to realize an automatic driving of a vehicle that follows along the target pathway 62 generated in that manner.

The target pathway generating unit 16 that has generated a target pathway corresponding to the curved path completes the generation of a target pathway of the entire subsequent section, by linking the generated target pathway with the target pathways generated for the areas before and after the curved path. Then, the drive control unit 12 controls the driving of the vehicle 100 based on the generated target pathway.

Modified Example 1

A modified example of the first embodiment will be described below.

In the example described above, the target pathway generating unit 16 sets a virtual area 60 when it is determined that a physical obstacle is present in the middle of a curved path, generates a target pathway using the virtual area 60, and reduces the generation of wobbles in the trajectory of the target pathway. However, the invention is not limited to this example. For example, upon determining that a curb 50 is present in even one location in the middle of a curved path, the target pathway generating unit 16 can move the boundary L1 in the curve path 58 to the inner side of the curve by a predetermined range, without setting a virtual area. That is, upon determining that a curb 50 is present as an object to be avoided, a target pathway of the vehicle can be generated, which avoids a predetermined area up to the curved path start position 54 and the curved path end position 56 including the curb 50.

By moving this boundary L1, it is possible to set the margin from the outer end of the curve of a right-turn-only road to, for example, an avoidance margin that is larger than the normal margin that is set in the map information. Therefore, it is possible to provide a target pathway that reduces wobbles in the trajectory in the vicinity of a curb 50, and to reduce discomfort that is imparted to the user, with such a modified example as well.

Second Embodiment

Figure 5:
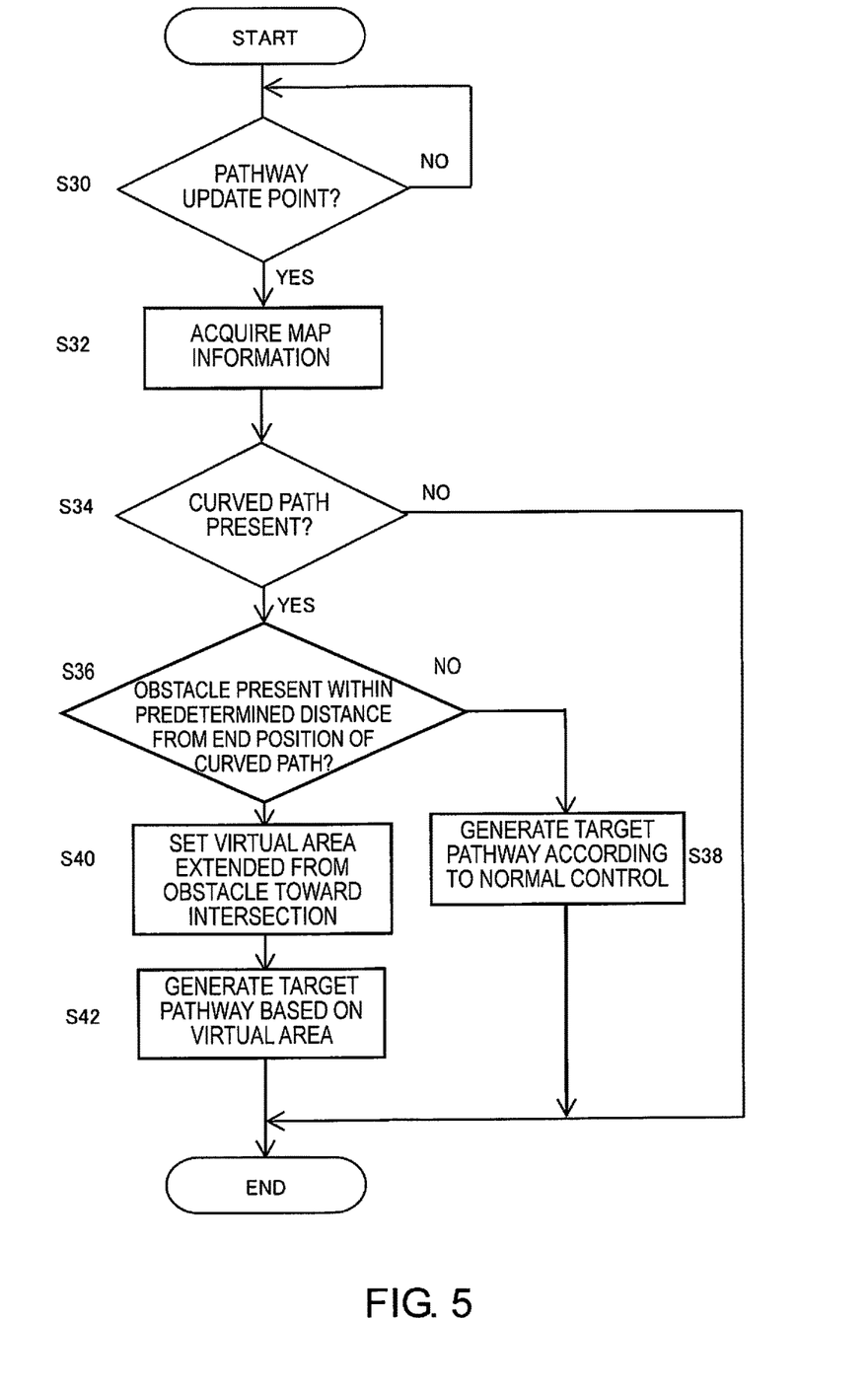
FIG. 5 is a flowchart illustrating the process of generating a target pathway for a curved path according to a second embodiment.
Figure 6:
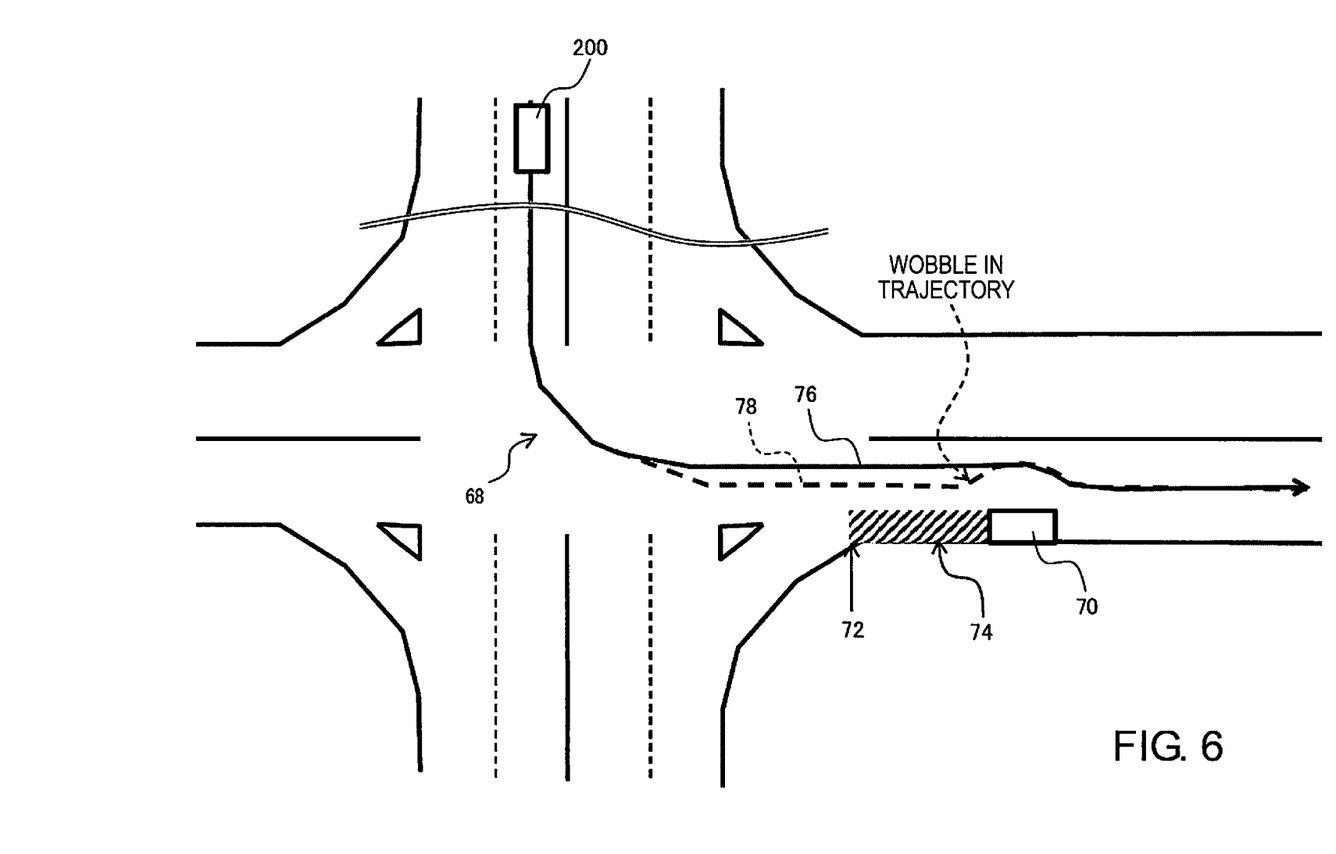
FIG. 6 is a schematic view illustrating a road layout with a curved path and a target trajectory of the vehicle according to the second embodiment.

Next, the driving control device 10 according to the second embodiment will be described, with reference to FIG. 5 and FIG. 6. FIG. 5 is a flowchart illustrating the process of generating a target pathway for a curved path according to the second embodiment. FIG. 6 is a schematic view illustrating the road layout of a curved path and a target trajectory of the vehicle according to the second embodiment. In the second embodiment, the point relating to the generation of a target pathway, when a physical obstacle is present on the front side of a curved path 68 in the progress direction, within a predetermined range from the endpoint of the curved path 68, is different from the first embodiment. Configurations that are the same as the first embodiment are given the same reference symbols, and redundant descriptions are omitted.

In the second embodiment, an example will be described in which the map information acquired when generating a target pathway contains a left-turn course, wherein the lane in which a vehicle 200 equipped with the driving control device 10 is currently automatically driving is connected to an intersection in the subsequent section, and the vehicle 200 will enter the intersection and make a left turn, as illustrated in FIG. 6. Additionally, the map information contains obstacle information to the effect that a parking area 70 is present within a predetermined distance after the vehicle 200 passes the intersection. Of course, the road layout in FIG. 6 is only an example, and a curved path 68 is not limited to this example. Additionally, the physical obstacle is not limited to a parking area 70, and can be, for example, a construction site, a bus stop, or a taxi stand.

The process of generating a target pathway of the curved path 68 according to the second embodiment will be specifically described below. The processing flow from Step S30 to Step S32 is the same as the processing flow from Step S10 to S12 in the first embodiment.

When the map information is acquired in Step S32, the curved path determination unit 32 determines whether or not a curved path 68 is present in the subsequent section for which a target pathway should be generated, based on the map information, in Step S34. Here, a left-turn course is searched wherein the lane in which the vehicle 200 is currently automatically driving is connected to an intersection in the subsequent section, and the vehicle will enter the intersection and make a left turn, as illustrated in FIG. 6. Therefore, the curved path determination unit 32 determines that a curved path 68 is present in Step S34. At this time, the curved path determination unit 32 further identifies the end position of the curved path 72 of the left-turn course, with reference to the map information. For example, the curved path determination unit 32 identifies the side of the intersection as the end position of the curved path 72.

Upon determining that a curved path 68 is present in Step S34 (YES in Step S34), the obstacle determination unit 34 determines whether or not an obstacle is present on the front side of the left-turn course in the progress direction, within a predetermined distance from the end position of the curved path 72, in Step S36. In the second embodiment, the obstacle determination unit 34 determines whether or not a physical obstacle is present as an obstacle. Here, as described above, the map information includes the fact that a parking area 70 is present within a predetermined distance from the end position of the curved path 72 of a left-turn course. Therefore, the obstacle determination unit 34 determines that a physical obstacle is present in Step S36 (YES in Step S36).

Upon determining that a physical obstacle is not present in Step S36 (NO in Step S36), the target pathway generating unit 16 executes the generation of a target pathway in the curved path by a normal control, in the same manner as in the first embodiment (Step S38).

On the other hand, upon determining that a physical obstacle is present in Step S36 (YES in Step S36), the virtual boundary setting unit 36 sets a virtual boundary in Step S40. Specifically, the virtual boundary setting unit 36 sets a virtual area 74 that extends from the parking area 70 toward the intersection, at least up to the end position of the curved path 72 of the left-turn course (side end of the intersection), as a virtual boundary, as illustrated in FIG. 6. While the virtual area 74 is set as the virtual boundary here, the virtual boundary is not limited to the virtual area. For example, the virtual boundary can be a virtual line that extends from the parking area 70.

Thereafter, the curved path target pathway generating unit 38 generates a target pathway 76 based on the set virtual area 74 in Step S42. Specifically, the curved path target pathway generating unit 38 recognizes the set virtual area 74 as a physical obstacle, in the same manner as the parking area 70, and generates a target pathway 76 that secures the same avoiding distance with respect to not only the parking area 70 but also the virtual area 74. As a method of generating a target pathway 76, for example, a target pathway 76 can be generated such that the boundary position of the drivable area with respect to the virtual area 74 and the parking area 70 is changed; in other words, the width of the drivable area is changed to be narrower, and that the vehicle 200 travels the center of the drivable area after the change, in the same manner as the first embodiment.

In FIG. 6, the target trajectory of the target pathway 76 of the vehicle generated in the second embodiment is illustrated by a solid line. In addition, in FIG. 6, a trajectory 78 that is generated so as to avoid only the parking area 70 is illustrated by a dotted line, as a comparative trajectory.

The comparative trajectory 78 of FIG. 6 is generated so as to secure an avoiding distance only with respect to a parking area 70. Therefore, in the comparative trajectory 78, a wobble is present before passing the parking area 70. Since such a wobble in the trajectory is generated at the end position of the intersection, that is, at a position near the end position of the curved path 72, the behavior of the vehicle is changed again immediately after passing the intersection, imparting discomfort to the ride quality of the user.

On the other hand, in the second embodiment, the obstacle determination unit 34 determines whether or not an object to be avoided is present on the front side of the left-turn course in the progress direction, within a predetermined distance from the end position of the curved path 72, based on the map information. Then, upon determining that a parking area 70 is present as an object to be avoided, the virtual boundary setting unit 36 extends a virtual area 74 as the virtual boundary from the parking area 70 toward at least the end position of the curved path 72. Thereafter, the curved path target pathway generating unit 38 controls the distance between the drivable area, which indicates the drivable range, and the parking area 70 as well as the virtual area 74. That is, the curved path target pathway generating unit 38 changes the distance between the boundary of the drivable area and the parking area 70, as well as the virtual area 74 to be increased, and generates a target pathway 76 based on the changed distance. That is, a virtual area 74 is set, and not only the parking area 70 but also the virtual area 74 is recognized as a physical obstacle, to generate a target pathway 76, as illustrated in FIG. 6. Therefore, since a target pathway 76 is calculated so at to secure an avoiding distance also with respect to the virtual area 74, a target pathway 76 that avoids the parking area 70 is generated from further on the front side of the parking area 70, and a wobble in the trajectory of the target pathway 76 is not generated in the vicinity of the parking area 70. Accordingly, it is possible to reduce discomfort that is imparted to the user, even upon determining that a parking area 70 is present in the vicinity of the curved path 68.

Modified Example 2

A modified example of the second embodiment will be described below.

In the example described above, when a parking area 70 is present within a predetermined distance from the end position of the curved path 72, the target pathway generating unit 16 sets a virtual area 74, and then recognizes the virtual area 74 as a physical obstacle, to reduce the generation of wobble in the trajectory of the target pathway. However, the invention is not limited to this example. For example, if a parking area 70 is present within a predetermined distance from the end position of the curved path 72, the target pathway from the parking area 70 to the end position of the curved path 72 can be configured such that the margin from the end portion of the lane is set, for example, as an avoidance margin that is larger than the normal margin that is set in the map information. That is, upon determining that a parking area 70 is present as an object to be avoided, a target pathway of the vehicle can be generated, which avoids a predetermined area up to the end position of the curved path 72 including the parking area 70. It is possible to provide a target pathway without generating wobble in the trajectory in the vicinity of a parking area 70, and to reduce discomfort that is imparted to the user, with such a modified example as well.

Third Embodiment

Next, the driving control device 10 according to the third embodiment will be described. In the third embodiment, the method of detecting a physical obstacle when generating a target pathway is different from the first embodiment. That is, the obstacle determination unit 34 does not determine whether or not an object to be avoided is present based on map information, but rather, determines whether or not an object to be avoided is present by acquiring ambient information of the vehicle that is detected. Since the other configurations are the same as the first embodiment, the same configurations are given the same reference symbols, and redundant descriptions are omitted.

In the third embodiment, a physical obstacle is detected utilizing the radar 20 and the camera 22, instead of map information that is stored in the navigation system 26. Specifically, the object state detection unit 14 detects the position of an object that is present around the host vehicle as ambient information of the vehicle, by using data that are detected by the radar 20 as well as images of the host vehicle surroundings captured by the camera 22. Then, the obstacle determination unit 34 determines whether or not a physical obstacle is present in the vicinity of the curved path, by utilizing the course from a departure point to the destination searched by the navigation system 26, and the object detected by the object state detection unit 14.

Furthermore, a physical obstacle can be detected using information that is received by inter-vehicle communication, instead of map information that is stored in the navigation system 26. For example, an inter-vehicle communication device that communicates vehicle information, including the position and operating state of the vehicle, between vehicles can be mounted on the vehicle. Then, the object state detection unit 14 can detect, for example, a vehicle that is parked as ambient information of the vehicle, based on vehicle information from the inter-vehicle communication device. Then, the obstacle determination unit 34 can determine whether or not a parked vehicle is a physical obstacle in the vicinity of the curved path, based on the course from a departure point to the destination searched by the navigation system 26, and the parked vehicle information that is detected by the object state detection unit 14.

Fourth Embodiment

Next, the driving control device 10 according to the fourth embodiment will be described. In the fourth embodiment, the obstacle that is detected when generating a target pathway is different from the first embodiment. Since the other configurations are the same as the first embodiment, the same configurations are given the same reference symbols, and redundant descriptions are omitted.

In the first embodiment, the object to be avoided is fixed with respect to a curved path; that is, the detected obstacle is a stopped physical obstacle, such as a curb. However, in the fourth embodiment, the obstacle that is detected as an object to be avoided can be a movable body that is moving relative to a curved path, rather than a stopped physical obstacle. Examples of a movable body include motorcycles, bicycles, and pedestrians.

Specifically, the object state detection unit 14 detects an object using map information, data from the radar 20, image data captured by the camera 22, and the like, and tracks the object to thereby detect the relative speed of the object from the curved path, and the relative position of the object with respect to the curved path. Then, the object state detection unit 14 determines whether or not the object is a moving body based on the detected information. Thereafter, the obstacle determination unit 34 determines whether or not the moving body will become an object to be avoided in the vicinity of the curved path. If the moving body is an object to be avoided, a target pathway is generated based on the virtual boundary by Step S22 of FIG. 3. Of course, the fourth embodiment can also be applied to the second embodiment.

In this manner, with the driving control device 10 comprising the target pathway generating unit 16 according to the fourth embodiment, it is possible to provide a target pathway that reduces wobbles in the trajectory in the vicinity of a moving body, and to reduce discomfort that is imparted to the user, even when it is determined that a moving body is present on the curved path as an object to be avoided.

OTHER EMBODIMENTS (1) The first embodiment to the fourth embodiment were described above as different embodiments. However, two or more embodiments can be variously combined and executed.

(2) In the embodiments described above, the target pathway generating unit 16 carries out generating and updating of a target pathway, when the host vehicle reaches a pathway update point, but no limitation is imposed thereby. For example, a target pathway from the current position to the destination can be generated when the user inputs a destination.

(3) In the embodiments described above, examples were described in which the target pathway generating unit 16 basically generates a target pathway, whereby the vehicle travels the center of the drivable area acquired from the map information. However, it is not necessary for the target pathway to be in the center of the drivable area, and a target pathway can be generated in a position different from the center of the drivable area, as long as the two ends of the vehicle in the vehicle width direction do not exceed the drivable area. For example, a target pathway can be provided further on the inner side of the curve than the center of the drivable area with respect to the curved path.

(4) The generation of a target pathway of the present application can be used even if a fully autonomous driving control is not carried out, or even when an autonomous driving control is not carried out at all. For example, the target pathway generated by the target pathway generating unit 16 can be simply notified to the driver, or the driving conditions for achieving the generated target pathway can be notified to the user. In these cases, driving support for supporting the driving of the user (driver) will be carried out instead of an autonomous driving control. In addition, even if a fully autonomous driving control is not carried out, driving assistance can be carried out, such as carrying out only acceleration/deceleration, or only steering by the driving control device 10.

(5) The embodiments described above can be applied to driving by both a traffic regulation that stipulates a right-hand traffic of vehicles, and a traffic regulation that stipulates a left-hand traffic of vehicles.

The target pathway generating device and the driving control device comprising a target pathway generating unit of the present invention were described in detail above, but the present invention is not limited to the embodiments described above. Additionally, it goes without saying that various improvements and modifications may be made without departing from the spirit of the present invention.

The invention claimed is:

1. A target pathway generating device comprising:
an electronic controller having acquired map information, the electronic controller being configured to
determine whether or not a curved path is present in a driving pathway of a vehicle based on the map information,
determine whether or not there is an object to be avoided in a vicinity of the curved path upon determining that a curved path is present,
set a virtual boundary having a border that extends from and along the object to be avoided toward at least one of a start position and an end position of the curved path so that a contour of the border of the virtual boundary matches a contour of a line defining one side of a road path on which the vehicle is traveling for an entire distance at least between the object to be avoided and the at least one of the start position and the end position of the curved path, upon determining that the object to be avoided is present, and
generate a target pathway for the vehicle that avoids the object to be avoided and the virtual boundary that has been set, upon determining that the object to be avoided is present.

2. The target pathway generating device according to claim 1, wherein
the electronic controller is configured to determine whether or not the object to be avoided is present in a curve section of the curved path.

3. The target pathway generating device according to claim 2, wherein
the electronic controller is configured to set the virtual boundary that extends from the object to be avoided to a start position of the curved path and an end position of the curved path.

4. The target pathway generating device according to claim 1, wherein
the electronic controller is configured to determine whether or not the object to be avoided is present further on a front side of the vehicle than the curved path in the progress direction within a predetermined range from an end position of the curved path.

5. The target pathway generating device according to claim 4, wherein
the electronic controller is configured to set the virtual boundary that extends from the object to be avoided to at least the end position of the curved path.

6. The target pathway generating device according to claim 1, wherein
the map information contains information relating to a range in which the vehicle can drive; and
upon determining that an object to be avoided is present, the electronic controller is further configured to generate the target pathway based on a new drivable range, which is different from a drivable range of the map information.

7. The target pathway generating device according to claim 6, wherein
the electronic controller is further configured to change a boundary that defines the drivable range of the map information to a boundary that defines the new drivable range such that the boundary that defines the new drivable range is separated more from the object to be avoided and the virtual boundary than the boundary that defines the drivable range of the map information.

8. The target pathway generating device according to claim 1, wherein
the map information contains information relating to the object to be avoided, and
the electronic controller is configured to determine whether or not the object to be avoided is present in the vicinity of the curved path based on the map information.

9. The target pathway generating device according to claim 8, wherein
the object to be avoided is fixed with respect to the curved path.

10. The target pathway generating device according to claim 8, wherein
the object to be avoided is a moving body that is moving relative to the curved path.

11. The target pathway generating device according to claim 1, wherein
the electronic controller is configured to acquire ambient information of the vehicle that is detected and configured to determine whether or not the object to be avoided is present in the vicinity of the curved path.

12. A driving control device comprising the target pathway generating device according to claim 1, and further comprising:
a drive control unit configured to control the driving of the vehicle based on the target pathway generated by the target pathway generating device.

13. The driving control device according to claim 12, further comprising:
an electronic object state detector configured to detect ambient information of the vehicle,
the electronic controller is further configured to acquire the ambient information of the vehicle that is detected by the electronic object state detector, and configured to determine whether or not the obstacle is present in the vicinity of the curved path.

* * * * *